United States Patent Office 3,404,179
Patented Oct. 1, 1968

3,404,179
PROCESS FOR PREPARING ADIPIC ACIDS BY ALKALINE FUSION OF E - HYDROXY - CAPROIC ACID AND ITS DERIVATIVES
Francis Weiss, Jacques Modiano, and André Lakodey, Pierre-Benite, France, assignors to Societe d'Electro-Chimie, d'Electro-Metallurgie et des Acieries Electriques d'Ugine, Paris, France, a corporation of France
No Drawing. Filed Mar. 12, 1965, Ser. No. 439,431
Claims priority, application France, Mar. 13, 1964, 967,230; Aug. 7, 1964, 984,546; Aug. 10, 1964, 984,670
10 Claims. (Cl. 260—537)

ABSTRACT OF THE DISCLOSURE

A process for preparing adipic acid by the alkaline fusion of E(epsilon)-hydroxycaproic acid or its derivatives to form an alkaline or alkaline earth adipate and the subsequent conversion of the adipate into adipic acid by an inorganic acid or cation exchanger resin.

This invention relates to a process for preparation of adipic acids which comprises subjecting E(epsilon)-hydroxycaproic acids or their derivatives to an alkaline fusion.

The E(epsilon)-hydroxycaproic acids which represent the starting materials of the process have the general formula:

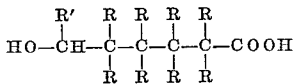

in which R and R' represent either an atom of hydrogen or an alkyl radical, such as: methyl, ethyl, propyl, isopropyl, butyl, isobutyl, tertiary butyl, hexyl, octyl, dodecyl, cyclohexyl, etc.

The derivatives of the acids hereinabove which can be employed are all those which when subjected to an alkaline fusion or preliminary treatment with an alkaline or alkaline earth agent, are transformed into an alkaline or alkaline earth salt of E(epsilon)-hydroxycaproic acid. Included among such derivatives are alkyl esters, amides, nitriles, E(epsilon)-acyloxycaproic acids, E(epsilon)-caprolactones, cyclic oligomers of the E(epsilon)-caprolactones, linear polyesters of the E(epsilon)-hydroxycaproic acids which result in salts by saponification. These products are employed alone or in mixture with each other.

Our process comprises in an initial stage subjecting the E(epsilon)-hydroxycaproic acid or one of its derivatives to an alkaline fusion at high temperature to convert the acid function or the derived function, as well as the alcohol function, into carboxylic acid functions in the form of their alkaline or alkaline earth salts and thereby form an alkaline or an alkaline earth adipate or adipates. Then in a second stage, the alkaline or alkaline earth adipate formed in the initial stage is converted into adipic acid.

The acid function or the derived function of an E(epsilon)-hydroxycaproic acid may be converted into a salt beforehand by simple neutralization or saponification, as the case may be, to obtain salt of E(epsilon)-hydroxycaproic acid with alkaline or alkaline earth hydroxides, or alkaline or alkaline earth carbonates or bicarbonates. This salt, which may or may not be isolated from its environment is subsequently processed according to the invention in order to convert the alcohol function into a carboxyl acid function in the form of its alkaline or alkaline earth salt and thereby obtain the alkaline or alkaline earth adipate.

The process is shown schematically in the case of a lactone treated with anhydrous sodium hydroxide by the following equations:

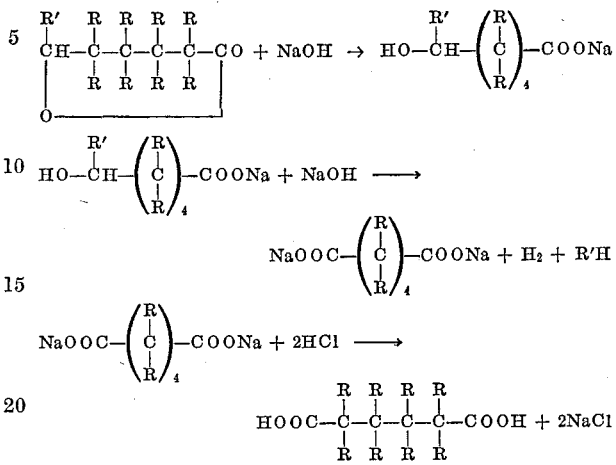

In a first step within the initial stage, an alkaline salt of hydroxycaproic acid is obtained and in a second step, the alkaline salt of the adipic acid is produced. During the course of the second stage, the adipic acid is produced by acidification of the adipate with an inorganic acid, or by passage over a cation exchanger resin.

The conversion reaction of an alcohol function into a carboxylic acid function by alkaline fusion has been described for certain monovalent alcohols. However, from this no deduction could be drawn to the effect that a process using such a reaction could successfully convert the E(epsilon)-hydroxycaproic acids into adipic acids.

On one hand it is known that the alcohols which have less than seven atoms of carbon in the chain frequently result in an olefin by dehydration. On the other hand, it could be expected that the salts of adipic acids would decompose into cyclic ketones by decarboxylation under the conditions of the reaction. To our surprise we found that the process of the invention produced adipic acids in very high yields, being almost quantitative in certain cases. In addition to the advantage of high yields which benefits the general economy of the process, our process obtained easy production of a product of high purity, which is particularly important in the case of the non-substituted adipic acid, whose principal application is in production of polyamides.

In practice of the process, the alkaline agent is a strong inorganic base formed by an alkaline or alkaline earth hydroxide which is employed in at least theoretical quantity. Included among satisfactory bases are hydroxides of sodium or potassium, lime, baryta, or any mixture of these reactants, such as soda-lime for example.

An excess of the alkaline agent may be employed, i.e., in amounts of 10% to 50% of theoretical but exceeding this last value substantially does not achieve an advantage.

The alkaline fusion is performed at a temperature of 180° C. to 400° C., and preferably at 220° C.–350° C. Complete conversion is attained within a period of 1 to 6 hours as a rule.

While the process may be practiced in the absence of a solvent, it is advantageous as a rule to add a certain quantity of water to facilitate the homogenization of the reaction mixture by solubilizing it at least partially. By way of indication, the quantity of water added, which is not critical, may amount to 20 mols per mole of the alkaline agent.

Depending upon conditions adopted, the reaction may be performed at atmospheric pressure, but it is preferable to operate under pressure so as not to evaporate the water added to the mixture. In this case, the reaction mixture may be kept under autogeneous pressure which rises as the reaction progresses with release of hydrogen or in certain cases release of a hydrocarbon when R' is not H. Also the pressure may be regulated at a constant value by withdrawing the gases as they are formed during the reaction.

The derivatives of epsilon-hydroxycaproic acids employed alone or mixed with each other in our process include the alkyl esters, the amides, the nitriles, the epsilon-acyloxycaproic acids, the epsilon-caprolactones, the cyclic oligomers of epsilon-caprolactones and the linear polyesters of the epsilon-hydroxycaproic acids. Certain of these derivatives normally result from oxidation of cyclohexanol or of cyclohexanone with oxygen or hydrogen peroxide in a formic or acetic acid medium for example.

A crude mixture of these derivatives may be employed without separation from the different constituents for production of adipic acid by alkaline fusion according to our process. Although a saving in cost results by not separating the different constituents, and even if the totality of the hydroxycaproic derivatives is exploited to best advantage, an operation of this kind nevertheless has the disadvantage of losing the carboxylic acid (for example acetic or formic acid) which reappears in the form of salts in the mixture resulting from the alkaline fusion. Such practice moreover entails an increased consumption of alkaline agent in the alkaline fusion, and of the inorganic acid during the acidification of the saline solutions to obtain the adipic acid. The acetic or formic acid may well appear again in this final stage, in the uncombined state in an acidified aqueous solution; however, these solutions are too dilute for economical recovery of the acetic or formic acids.

A modification of our invention comprises preliminary treatment of the crude mixtures of epsilon-hydroxycaproic derivatives containing epsilon-acyloxycaproic acids to recover the combined carboxylic acid, before performing the alkaline fusion to obtain the adipic acid. In this treatment the mixtures are heated in the presence of a catalyst which is a conventional esterification catalyst, such as the strong inorganic or organic acid (hydrochloric, sulphuric, phosphoric, methane-sulphonic, benzene-sulphonic, paratoluene-sulphonic, etc.) or a cation exchanger resin such as sulphonated copolymers of styrene and of divinylbenzene, for example. The combined carboxylic acid thus released is collected by distillation. The residue formed is a mixture mainly containing polyesters of epsilon-hydroxycaproic acid which are processed thereafter according to our process to obtain the adipic acid.

The heating of the crude mixtures is performed at temperatures between 80 and 150° C. for example, in such manner that the reaction occurs at sufficient speed in the presence of the customary quantities of catalyst. The amount of the catalyst is 0.1% to 5% by weight of the acid catalyst or approximately 10 to 50% by weight of the cation resin.

Pressure conditions employed are such that the carboxylic acid or its distilled derivative distill in step with its release. Generally, the heating of the crude mixture is performed at atmospheric pressure, but may be carried out under reduced pressure if desired, for example to facilitate exhaustion by distillation at the end of the reaction.

The reaction lasts from 0.5 to approximately 10 hours. It need not be run to completion and it may prove economical to interrupt it when approximately 80% or even less of the carboxylic acid has been recovered, since the reaction periods needed in this case are much shorter.

To recover free carboxylic acid treatment of the crude mixtures is advantageously performed in the presence of a solvent which forms an azeotrope with the carboxylic acid to facilitate its elimination from the mixtures. Examples of such solvents include a saturated aliphatic hydrocarbon having 5 to 8 atoms of carbon, an aromatic hydrocarbon such as benzene, toluene, xylene and a halo-derivative such as carbon tetrachloride, chlorobenzene, etc.

Water may also be added, alone or with one of the above solvents, or steam may be injected continuously into the mixture, which also facilitates exhaustion of the carboxylic acid. In the case in which this acid is formic acid, use of water moreover offers the advantage of protecting it against decomposition when in contact with the acid catalyst.

The reactions of acidolysis or hydrolysis followed by polyesterification may be formulated as follows:

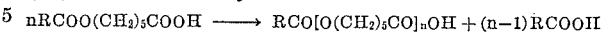

$nRCOO(CH_2)_5COOH + nH_2O \longrightarrow$

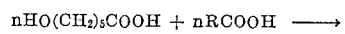

It is clear that depending upon operating conditions, the reaction mixture may vary in constitution in respect of the nature and molecular weight of the products which are present. As a rule, the mean molecular weight amounts to between 400 and 4000 approximately, but these values are given by way of indication only.

Treatment of the crude mixtures in the presence of a mono-alcohol having 1 to 4 atoms of carbon permits recovery of the carboxylic acid in the form of an ester under the same operating conditions, according to the formula:

$nRCOO(CH_2)_5COOH + nR'OH \longrightarrow$

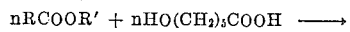

The acyloxycaproic derivatives undergoing the conversion which has been described, may already appear in the presence of polyesters or of hydroxycaproic acids formed during the production of these derivatives. They may also be accompanied by epsilon-caprolactones which as known are converted into polyesters under the action of the catalysts present and in the presence of water or of carboxylic acid which function as initiators.

Thus, our invention renders it feasible to convert a crude mixture of hydroxycaproic derivatives into a mixture essentially constituted of polyesters, and to recover the combined carboxylic acid.

The residue from treatment of the crude mixture thereafter undergo as the process of alkaline fusion, and then of acidification, after contingently driving off the solvent, the alcohol or the water by distillation. If an ion exchanger resin has been used as a catalyst it is sufficient to filter the same. By contrast, the inorganic or organic acid catalyst need not be eliminated.

We have discovered that the reaction which produces salts of adipic acids from derivatives of epsilon-hydroxycaproic acids, such as caprolactones or the corresponding polyesters for example, was favorably affected by presence of metallic cadmium or of compounds of this metal. More specifically, presence of cadmium or compounds thereof permitted lowering the temperature of reaction, or shortening the reaction period, or a combination of lowering the temperature and shortening the reaction period. These advantages occur when the alkaline fusion of the derivative or derivatives of epsilon-hydroxycaproic acid or acids is carried out in the presence of metallic cadmium or of compounds of this metal.

Included among the compounds of cadmium but not by way of limitation are the oxide, hydroxide, salts such as carbonate, formiate, acetate, etc.

The effective amount of cadmium or its compounds is between 0.5% and 10% for example, by weight of metal content relative to the weight of the hydroxycaproic derivative.

Separation of the cadmium or insoluble compounds thereof from the resultants of the fusion is by filtration or any other convenient method, before acidifying to isolate the adipic acid.

The following non-limiting examples illustrate our invention.

Example 1

An autoclave of one litre was charged with: 114 g. of epsilon-caprolactone (1 mol.), 123 g. of potassium hydroxide (2.2 mols.), 20 g. of water, and heating was performed for 3 hours at 280–300° C. The pressure rose progressively to 119 atmospheres. After cooling, the reactive mass was dissolved in 400 g. of water and filtered to eliminate some solid impurities in suspension. Acidification was then performed with 410 g. of 20% hydrochloric acid while maintaining the temperature at 20° C. to obtain adipic acid which was filtered and washed with a little cold water. After drying, the obtained crystals represented 126.5 g. (0.867 mol.) of adipic acid of 99.5% purity which melted at 151° C. and were colorless.

A further 9.5 g. of adipic acid was collected by extraction of the aqueous solution with methylethylketone, so that the overall yield was 93% of theoretical.

Example 2

The procedure of Example 1 was performed except that instead of the epsilon-caprolactone, the cyclic dimer of the epsilon-caprolactone (crystals melting at 114° C.) was used. With 114 g. (0.5 mol.) of this dimer, 133 g. of adipic acid was obtained in the form of colorless crystals at 99% purity which melted at 150–151° C. The liquors still contained 7 g. of adipic acid which was extracted whereby the overall yield rose to 96%.

Example 3

The procedure of Example 1 was performed except that 120 g. of a polyester of the epsilon-hydrocaproic acid instead of epsilon-caprolactone. This polyester had the following characteristics:

Cryoscopically determined molecular weight 1860; melting point 52° C.; and its saponification index established an equivalent weight of 117.

135 g. of adipic acid was obtained in the form of crystals which had a slight yellowish tint which titrated at 98% and which melted at 150° C. The mother liquor still contained 9.5 g. of dissolved adipic acid which was extracted, so that the overall yield reached 94.8%.

Example 4

120 g. of the same polyester as that employed for Example 3, 168 g. of potassium hydroxide, and 50 g. of water, were heated at 270° C. for 3 hours. After cooling, the reactive mass was dissolved in water and acidified by 400 g. of concentrated hydrochloric acid. 118 g. of adipic acid crystals was obtained, and which crystals melted at 151–152° C. The mother liquors after treatment with methylisobutylketone yielded another 14 g. of adipic acid whereby the overall yield rose to 88.5%.

Example 5

120 g. of the same polyester as that employed in Examples 3 and 4, 88 g. of sodium hydroxide and 20 g. of water, were heated at 250–280° C. for 4 hours. After cooling, the reactive mass was dissolved in 700 g. of water and the resulting solution was acidified. 127.5 g. of yellowish adipic acid crystals of 98% purity and melting at 149.5° C. were obtained. The washing waters still contained 12 g. of dissolved adipic acid, which was extracted whereby the overall yield reached 91.6%.

Example 6

73 g. (0.5 mol.) of methyl epsilon-hydroxycaproate, 95 g. (1.7 mols.) of potassium hydroxide and 20 g. of water were heated for four hours in an autoclave at 270° C. The pressure was established at 90 atmospheres.

After cooling, the mass was dissolved in water and acidified with hydrochloric acid.

Filtering and washing with water were performed. After drying, the crystals of adipic acid weighed 63.6 g. (yield 87.3%). They were colorless, melted at 151° and had 99% purity as shown by titration for acidimetry. The mother liquors still contained 5.5 g. of dissolved adipic acid, which was extracted, so that the overall yield amounted to 94.6%.

Example 7

131 g. (1 mol.) of epsilon-hydroxycaproamide, 123 g. (2.2 mols.) of potassium hydroxide, were heated for two hours at 290° C. in an autoclave, under 120 atmospheres. After the same processing operations as before, 109 g. of crystallized adipic acid (74.8% of theoretical) was obtained.

Example 8

125 g. (0.80 mol.) of a mixture containing 55% of 3,3,5-trimethyl epsilon-caprolactone and 45% of 3,5,5-trimethyl epsilon-caprolactone, 47 g. (1.17 mol.) of sodium hydroxide, 47 g. (0.84 mol.) of potassium hydroxide, were heated for 6 hours at 245–250° C. The final pressure amounted to 86 atmospheres. By dissolving the reactive mass in water and by acidification, a very viscous oily layer was obtained, which was decanted. The aqueous phase was extracted with ether and this extract was combined with the oily product. The totality of the organic products, distilled under 0.5 mm. Hg, yielded—after evaporation of the ether.

31 g. of a light fraction boiling at 65–95° C., whose analysis established that this mainly represented an ethylenic acid, 76.5 g. of a fraction boiling at 153–173° C., which was very viscous, crystallized partially, formed of a mixture of isomeric trimethyladipic acids (yield 51% of theoretical).

Example 9

114 g. (1 mol.) of epsilon-caprolactone, 90 g. of sodium hydroxide (2.25 mols.) and 60 g. of water were heated at 290° C. for three hours, in an 1-litre autoclave. After cooling, the mass was dissolved in 1000 g. of water at 70° C. This solution was passed over a bed of 3 litres of a cation exchanger resin in the acid form which was sold in the trade under the brand DOWEX 50. The solution thus processed was then concentrated to approximately one third by evaporation under vacuum, then cooled to 15° C. The precipitated adipic acid was filtered and was in the form of colorless crystals, weighing 140 g. after drying (yield 95.8%). This product was pure and melted at 152–153° C.

Example 10

48.6 parts of 70% hydrogen peroxide was added progressively in an hour, to a mixture of 98 parts of cyclohexanone and 172 parts of aqueous 80% formic and maintained at 60–65° C. After the addition, the temperature was raised to 90° C. for an hour, and the water and the excess of formic acid were then distilled under a pressure of 200 mm. Hg.

60 parts of toluene and 2 parts of 96% sulphuric acid were added to the residue, essentially formed of epsilon-formyloxycaproic acid, and the whole was heated to boiling point in a distillation plant while introducing 4 parts of water per hour. A distillate formed of two phases was collected. The aqueous phase containing the formic acid released during the polyesterification reaction was drawn off, and the toulene was returned to the reaction flask. The distillation of formic acid had ceased at the end of 5 hours.

The remainder of the toluene and water was then expelled from the distillation plant by evaporation under reduced pressure, and 112 parts of a light brown wax, melting at 50–52° C. and essentially formed of polyester of epsilon-hydroxycaproic acid was obtained. The mean molecular weight of the wax amounted to approximately 2,200, according to cryoscopy in benzene.

This product was charged into an autoclave with 82 parts of caustic soda and 20 parts of water, and heated for 3 hours at 270° C. under autogenous pressure which rose to 90 atmospheres at the end of the reaction. After cooling, the reactive mass was dissolved in 300 parts of water, and acidified with 215 parts by weight of 35% hydrochloric acid. The precipitated adipic acid was filtered and the crystals thereof were washed with water and stove-dried. 129 g. of adipic acid melting at 150–151° C. or 88% of theoretical quantity was obtained.

Example 11

Cyclohexanol was oxidized with oxygen, according to the teachings published in J. Am. Chem. Soc. 1955, 77, p. 1756.

280 g. of cyclohexanol and 2.8 g. of cyclohexanone peroxide (obtained by the action of hydrogen peroxide on cyclohexanone in the presence of a little hydrochloric acid) were placed into a 500 cm.$^3$ glass flask equipped with a rapid stirrer. A flow of 300 cm.$^3$ per minute of oxygen was allowed to bubble through a tube equipped with a disc plug of fritted glass, and heating was carried out to 120–125° C. The operation was stopped at the end of 45 minutes and the mixture which contained 0.31 equivalents of "peroxidic oxygen" and which corresponded to a rate of conversion of 11% of the cyclohexanol brought into action was examined.

This mixture was then introduced in the course of 30 minutes, into 210 g. of 98% formic acid, whilst keeping the temperature at 60–65° C. After the addition, heating was continued for 1½ hours at the same temperature, then for 1 hour at 80° C. The formic acid, water, excess of cyclohexanol, as well as the cyclohexyl formiate which had been formed, were then distilled in order to obtain a reaction product weighing 39 g. The latter was essentially formed of epsilon-formyloxycaproic acid, hydroxy-caproic polyester, and a small quantity of adipic acid.

This product was heated to boiling point with 0.5 g. of sulphuric acid and 10 g. of methanol for 2 hours, during which 12 g. of methyl formiate were distilled. The excess of methanol and water was then evaporated by heating for 3 hours at 150° C. under 10 mm. Hg to obtain a resulting product.

The resulting product was heated in an autoclave with 25 g. of 80% caustic soda for 3 hours at 275° C. The conventional separation processes were then carried out to obtain 28 g. of adipic acid, or 62% of theoretical quantity compared to the peroxide compound formed in the initial stage.

Example 12

The same polyester of epsilon-hydroxycaproic acid was employed as in Examples 3, 4 and 5.

100 g. of this polyester, 75 g. of anhydrous sodium hydroxide, 17 g. of water and 16 g. of dihydrated cadmium acetate, were heated in a 1-litre autoclave at 220–230° C. At the end of 3 hours, the pressure reached 52 atmospheres. The mixture was drained, the sludges in suspension were filtered off, and acidification was carried out. The precipitated adipic acid was filtered, washed with water and dried. 44 g. were obtained, which represented a rate of conversion of 35%.

Example 13

The procedure followed was that of Example 12 but heating was performed for 8 hours. 108 g. of adipic acid were then obtained, corresponding to a rate of conversion of 86%.

Example 14

The operation was performed as in Example 12, but employing 7 g. of metallic cadmium filings, instead of cadmium acetate.

In a first test extending over 3 hours of boiling, the rate of conversion into adipic acid obtained amounted to 27%, the final pressure in the autoclave being of 38 atmospheres.

In a second test extending over 8 hours of boiling, the rate of conversion rose to 77%.

Example 15

By way of comparison, 100 g. of the same polyester as in the preceding Examples 12, 13 and 14, 75 g. of caustic soda, and 17 g. of water, were heated at 220–230° C. for 8 hours, in the absence of cadmium or of cadmium compound.

No hydrogen was released and the pressure did not exceed 8 atmospheres. No adipic acid was obtained by acidifying the mixture thus processed.

While we have described preferred embodiments of our invention, it may be otherwise embodied within the scope of the appended claims.

We claim:
1. A process for the preparation of adipic acid comprising:
   (A) subjecting at least one member of the group consisting of alkaline hydroxide and alkaline earth hy- of epsilon-hydroxycaproic acid, amides of epsilon-hydroxycaproic acid, nitriles of epsilon-hydroxycaproic acid, epsilon-acyloxycaproic acids, epsilon-caprolactones, cyclic oligomers of epsilon-caprolactones and linear polyesters of epsilon-hydroxycaproic acid to an alkaline fusion at a temperature substantially about 180° C. to 400° C. by reaction with at least one alkaline agent selected from the group consisting of alkaline hydroxide and alkaline earth hydroxides in at least theoretical quantities to form alkaline and alkaline earth adipates; and
   (B) converting the adipate into adipic acid by treating the adipate with a member selected from the group consisting of an inorganic acid and a cation exchanger resin.
2. The process of claim 1 wherein the alkaline agent is used in amounts of at least 10% in excess of theoretical quantity.
3. The process of claim 1 wherein the alkaline fusion is performed at a temperature substantially about 220° C. to 350° C.
4. The process of claim 1 wherein the alkaline fusion is performed in the presence of a member selected from the group consisting of cadmium and compounds of cadmium in amounts substantially about 0.5% to 10.0% of the weight of metallic cadmium relative to the weight of the derivative.
5. The process of claim 1 wherein the alkaline fusion is performed in the presence of water in amounts up to 20 mols per mol of the alkaline agent.
6. The process of claim 5 wherein the alkaline fusion is carried out under a pressure greater than atmospheric.
7. A process for the preparation of adipic acid comprising:
   (A) heating a mixture of epsilon-hydroxycaproic acid derivatives containing epsilon-acyloxycaproic acid in the presence of an esterification catalyst to distill off carboxylic acid and its derivatives from the mixture and to form a residue containing polyesters of epsilon-hydroxycaproic acid;
   (B) subjecting said residue to an alkaline fusion at a temperature substantially about 180° C. to 400° C. by reaction with at least one alkaline agent selected from the group consisting of alkaline hydroxides and alkaline earth hydroxides in at least theoretical quantities to form alkaline and alkaline earth adipates; and,
   (C) converting the adipates to adipic acid by treating the adipate with a member selected from the group consisting on an inorganic acid and a cation exchanger resin.

8. The process of claim 7 wherein the heating of the mixture is carried out at a temperature substantially about 80° C. to 150° C.

9. The process of claim 7 wherein the alkaline fusion is carried out in the presence of water in amounts up to 20 mols per mol of alkaline agent.

10. The process of claim 7 wherein the alkaline fusion is carried out in the presence of a member selected from the group consisting of cadmium and cadmium compounds in an amount substantially about 0.5% to 10.0% by weight of metallic cadmium relative to the weight of the derivatives in the residue.

References Cited

UNITED STATES PATENTS

| | | | |
|---|---|---|---|
| 2,614,122 | 10/1952 | Mikeska | 260—531 |
| 2,926,182 | 2/1960 | Sutton | 260—531 |

FOREIGN PATENTS 601,817  5/1948  Great Britain.

OTHER REFERENCES

Houben-Weyl, Methoden der Organischen Chemie, June 2, 1963, p. 777.

LORRAINE A. WEINBERGER, *Primary Examiner.*

V. GARNER, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,404,179                                                          October 1, 1968

Francis Weiss et al.

It is certified that error appears in the above identified patent and that said Letters Patent are hereby corrected as shown below:

Column 8, line 25, cancel "of alkaline hydroxide and alkaline earth hy-"; line 26, after "acid," insert -- alkyl esters of epsilon-hydroxycaproic acid,"; line 75, "adipate" should read -- adipates --. Column 9, line 1, "on" should read -- of --.

Signed and sealed this 17th day of February 1970.

(SEAL)

Attest:

Edward M. Fletcher, Jr.

Attesting Officer

WILLIAM E. SCHUYLER, JR
                                                           Commissioner of Patents